(12) United States Patent
Kosakowski et al.

(10) Patent No.: US 9,112,660 B2
(45) Date of Patent: Aug. 18, 2015

(54) MAXIMUM LIKELIHOOD DETECTION

(71) Applicant: BlackBerry Limited, Waterloo (CA)

(72) Inventors: Martin Kosakowski, Bochum (DE);
Martin Geoffrey Leach, Cambridge (GB); Erwin Hemming, Herne (DE)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/013,715

(22) Filed: Aug. 29, 2013

(65) Prior Publication Data

US 2015/0063503 A1    Mar. 5, 2015

(51) Int. Cl.
*H04L 5/02*    (2006.01)
*H04L 1/00*    (2006.01)
*H04B 7/04*    (2006.01)

(52) U.S. Cl.
CPC ............ *H04L 1/0054* (2013.01); *H04B 7/0452* (2013.01)

(58) Field of Classification Search
CPC ....... H04L 1/0054; H04L 27/32; H04L 27/34; H04L 27/38; H04L 27/2601

USPC .......... 375/341, 260, 262, 265, 271, 302, 320
See application file for complete search history.

(56) References Cited

U.S. PATENT DOCUMENTS

2013/0287150 A1*  10/2013  Jung et al. .................... 375/341

\* cited by examiner

*Primary Examiner* — Kevin Kim
(74) *Attorney, Agent, or Firm* — Jose Gutman; Fleit Gibbons Gutman Bongini & Bianco P.L.

(57) ABSTRACT

A method of symbol detection in an electronic device employing multi-user multiple input multiple output (MU-MIMO) communication over a first transmission layer of first and second transmission layers comprises various steps. A receiver comprises processing circuitry for performing these steps. A transmitted signal is received. The transmitted signal is decoded by detecting data symbols within the transmitted signal for the first transmission layer by performing Maximum Likelihood (ML) detection on the first transmission layer. ML detection comprises performing a search across all possible symbol constellation points in a set of constellation points available for the second transmission layer.

27 Claims, 7 Drawing Sheets

MAXIMUM LIKELIHOOD DETECTION

FIELD OF THE DISCLOSURE

The present disclosure concerns maximum likelihood (ML) detection in a multiple input multiple output communication environment.

BACKGROUND

In Multi User Multiple Input Multiple Output MIMO (MU-MIMO) systems, an extended version of space-division multiple access (SDMA) is employed in which a single transmitter sends separate signals to multiple receivers which then receive separate signals simultaneously over the same channel. In such systems, due to the spatial processing that occurs at the transmitters, it is necessary to have knowledge at the receiver of the channel characteristics for the different signals so that effective signal detection and decoding of the signals can take place. MIMO (including MU-MIMO) communication systems are employed by many different communication standards, such as IEEE 802.11n (Wi-Fi), Third Generation Partnership Project (3GPP) Long Term Evolution (LTE) and Long Term Evolution Advanced (LTE-A), Worldwide Interoperability for Microwave Access (WiMAX) and High Speed Packet Access Evolution (HSPA+).

The three most relevant detector/decoding methods (known to the applicants) in MIMO based communication systems are:

ZF Detection (Zero Forcing)

The ZF detector inverts the channel and leads to full interference rejection, but this approach suffers from noise enhancement as the system noise is ignored in the detection process.

MMSE Detection (Minimum Mean Square Error)

The MMSE detector takes the channel and the noise into account and provides a solution, which minimizes the mean square error between estimated and transmitted data symbols.

ML Detection (Maximum Likelihood)

Unlike the ZF and the MMSE detector, the ML detector adopts a non-linear approach, which finds the most likely transmitted data symbols that cause the smallest squared error from the received data symbols by doing a joint detection via an exhaustive search, taking all possible received data symbol constellations into account. ML detection generally provides the best possible interference reduction of all available detection methods and no noise enhancement, resulting in the best possible decoding performance.

If the reference signals are known for the other user equipment (UE) (as is the case for TM8 and TM9 in LTE-A), then a ZF or MMSE decoder could be used to reduce the inter-UE interference for better demodulation performance. ML is even better, but ML requires knowledge of the modulation order of the other UE (as does MMSE-SIC), which in general is not known in LTE and certain other types of communication system.

DRAWINGS

Reference is made below to the accompanying drawings in which.

DESCRIPTION

Figure 1:
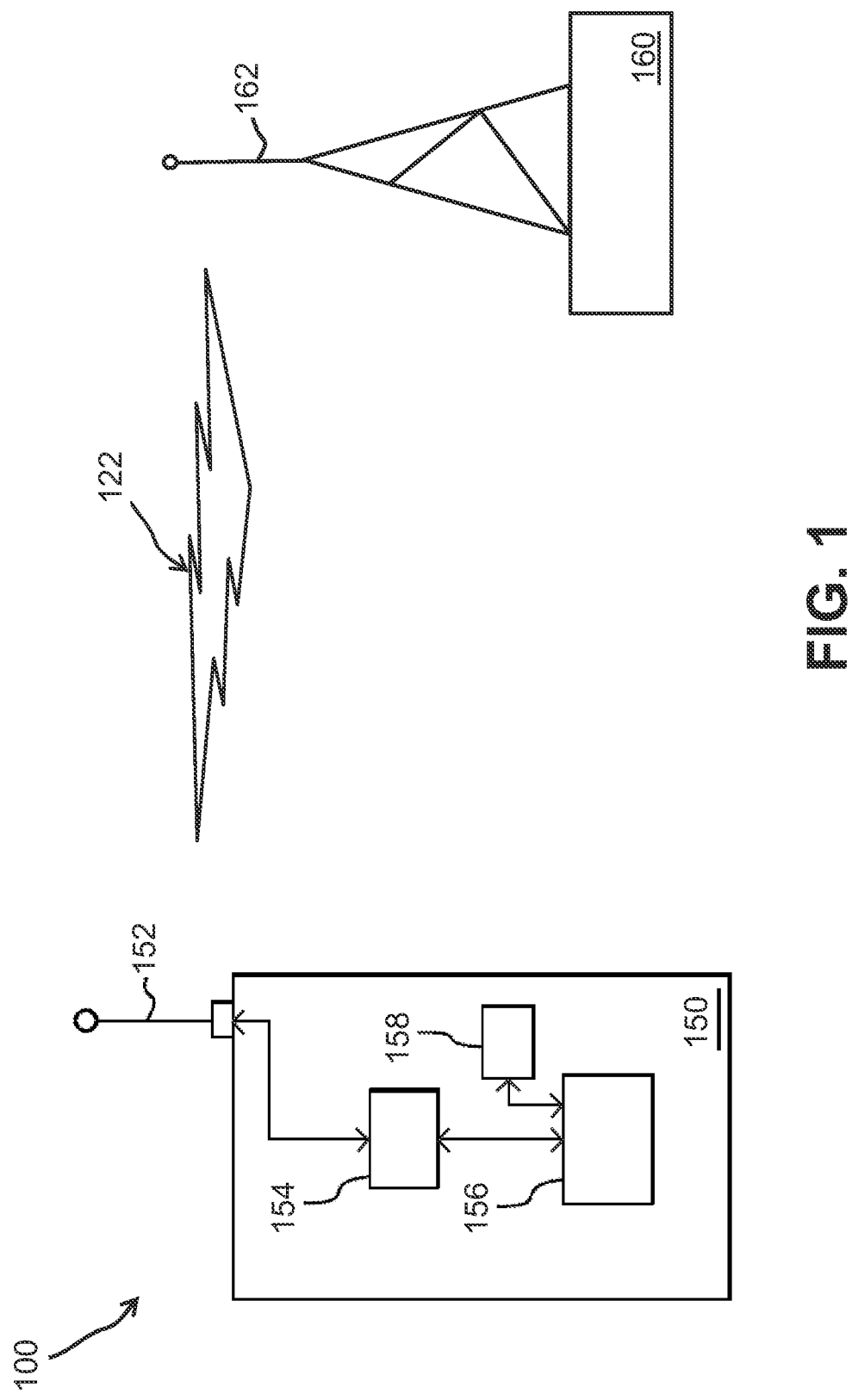
FIG. 1 is a schematic of a communication system according to the present disclosure.

Reference is made below to one or more particular examples which are not intended to be limiting on the scope of the disclosure.

In a first aspect, there is provided a method of symbol detection in an electronic device employing multi-user multiple input multiple output (MU-MIMO) communication over a first transmission layer of first and second transmission layers, comprising: receiving a transmitted signal; decoding the transmitted signal by detecting data symbols within the transmitted signal for the first transmission layer by performing Maximum Likelihood (ML) detection on the first transmission layer, wherein the step of performing ML detection comprises performing a search across all possible symbol constellation points in a set of constellation points available for the second transmission layer. The step of decoding may comprise demodulating the transmitted signal, whereby the transmitted signal has been modulated according to a digital modulation scheme. Such as scheme may be any orthogonal frequency digital modulation scheme, for example any one of: a zero point modulation scheme or a phase shift keying scheme, such as binary phase shift keying (BPSK), quadrature phase shift keying (QPSK), or a quadrature amplitude modulation scheme (QAM), such as QAM16 and QAM64 modulation schemes. Decoding can also comprise demodulating the received RF signal to baseband, prior to digital demodulation.

The step of performing the search may comprise determining the most likely transmitted data symbols for the first transmission layer which result in the smallest symbol error for all data symbols across said all possible symbol constellation points.

The method may further comprise outputting the most likely transmitted data symbols for the first transmission layer.

The first transmission layer may comprise data symbols modulated based on constellation points which are a subset of the set of constellation points available for the second transmission layer.

Said set of symbol constellation points for the second transmission layer may comprise a zero point and all points in QPSK, QAM16 and QAM64 modulation schemes, or all points in any one or both of PSK or QAM schemes. Said subset of symbol constellation points for the first transmission layer may consist of all points in one of any of the aforementioned modulation schemes, for example all points in any one or more of: QPSK, QAM16 and QAM64 modulation schemes. The zero point and all points in QPSK, QAM16 and QAM64 modulation schemes may collectively be referred to as QAM85, where 85 refers to the number of possible constellation points.

Said set of symbol constellation points for the second transmission layer may comprise one or more of: the zero point, all points in QPSK, all points in QAM16, all points in QAM64, and all points in QAM128. Generally, said set of constellation points may be defined as all points in modulations schemes: QAMn (where n can be $2^i$, where i is a positive integer, for example an integer i in the range 0 to 12, 0 to 10, 0 to 8, 0 to 7, 0 to 6, 0 to 5, 0 to 4, 0 to 3, 0 to 2, 0 and 1, or 0). In this regard, n defines the number of constellation points in each modulation scheme. One or more of the modulation schemes may be utilised for the set, and all points in each utilised modulation scheme are used to form the set. The subset of symbol constellation points for the first transmission layer may consist of all points in one, or in one or more of the modulation schemes which form the set of symbol constellation points for the second transmission layer.

The step of performing the search may further comprise performing the search across all possible symbol constellation points known for the first transmission layer and available for the second transmission layer.

The first transmission layer may be the transmission layer assigned to the electronic device. The second transmission layer may be the transmission layer assigned to an additional device which is different to the electronic device.

In a second aspect, there is provided an electronic device comprising processing circuitry configured to perform any one of the above methods.

In a third aspect, there is provided a computer-readable medium comprising computer executable instructions which when executed by processing circuitry cause the processing circuitry to perform the steps of any one of the above methods.

In a fourth aspect, there is provided an electronic device for performing multi-user multiple input multiple output (MU-MIMO) communication over a first transmission layer of first and second transmission layers, comprising: a receiver for receiving a transmitted signal; a decoder configured to decode the transmitted signal and detect data symbols within the transmitted signal for the first transmission layer by performing Maximum Likelihood (ML) detection on the first transmission layer with an ML detector, wherein the ML detector is configured to perform a search across all possible symbol constellation points in a set of constellation points available for the second transmission layer.

The decoder may comprise the ML detector.

The decoder may be further configured to determine the most likely transmitted data symbols for the first transmission layer which result in the smallest symbol error for all data symbols across said all possible symbol constellation points.

The decoder may be further configured to output the most likely transmitted data symbols for the first transmission layer.

The first transmission layer may comprise data symbols modulated based on constellation points which are a subset of the set of constellation points available for the second transmission layer.

Said set of symbol constellation points for the second transmission layer may comprise a zero point and all points in QPSK, QAM16 and QAM64 modulation schemes. Said subset of symbol constellation points for the first transmission layer may consist of all points in one of: QPSK, QAM16 and QAM64 modulation schemes.

The step of performing the search may further comprise performing the search across all possible symbol constellation points known for the first transmission layer and available for the second transmission layer.

The first transmission layer may be the transmission layer assigned to the electronic device. The second transmission layer may be the transmission layer assigned to an additional device which is different to the electronic device.

In a fifth aspect, there is provided a computer-readable medium comprising computer executable instructions which when executed by processing circuitry cause the processing circuitry to perform the steps of: receiving a transmitted signal; and decoding the transmitted signal by detecting data symbols within the transmitted signal for the first transmission layer by performing Maximum Likelihood (ML) detection on the first transmission layer, wherein the step of performing ML detection comprises performing a search across all possible symbol constellation points in a set of constellation points available for the second transmission layer.

The computer-readable medium may be non-transitory. The computer-readable medium may be a carrier comprising computer-executable instructions. The computer-readable medium may comprise a memory. The memory may be any of: random access memory (RAM), read-only memory (ROM), a CD-ROM and DVD. The memory may be connected to processing circuitry which is configured to execute the instructions.

FIG. 1 is an example of a communication system 100 which could employ the present invention. The communication system 100 comprises user equipment (UE) 150 which is an electronic device, such as a communication device, mobile device or phone, portable computing device, e.g. laptop or tablet device, or any other device which is adapted to communicate with the system 100. The user equipment (UE) 150 comprises processing circuitry 156 in communication with memory 158. The processing circuitry 156 is also in communication with signal processing circuitry 154 which is connected to antenna 152. The user equipment 150 may also include many other commonplace features which are likely to well-understood by the skilled person. These commonplace features are not shown in FIG. 1 since they are not the direct subject of the present invention, but may include a display screen, keypad or keyboard, touchscreen, power supply, such as a battery, input/output interfaces. Such commonplace features may be directly or indirectly connected to each other, to the processing circuitry 156, memory 158 and/or signal processing circuitry 154, and be in direct or indirect communication with each other, the processing circuitry 156, memory 158 and/or signal processing circuitry 154.

The communication system 100 also comprises a remote station 160, which may be a mobile station (MS), such as a mobile base station or any other device which is capable of communicating within the system 100 and with the user equipment 150. The station 160 may comprise station antenna 162 and signal processing and control circuitry (not shown), which may be directly or indirectly connected to the station antenna 162, and which may be similar or identical to the components of the user equipment (UE) as herein described.

Radio frequency (RF) signals 122 are generated by the user equipment 150 and the station 160 and pass between each other via the antenna 152 and station antenna 162, thereby permitting bi-directional communication between the user equipment 150 and the station 160. The RF signals 122 are modulated or demodulated by the user equipment 150 and/or the station 160 according to one or more modulation/demodulation schemes, which permits data, for example digital data, to be transmitted between the station 160 and the user equipment 150. The modulation schemes implemented by the communication system 100 including the user equipment 150 and station 160 may conform to one or more of various state-of the art schemes, such as those defined by as IEEE 802.11n (Wi-Fi), Third Generation Partnership Project (3GPP) Long Term Evolution (LTE) and Long Term Evolution Advanced (LTE-A), Worldwide Interoperability for Microwave Access (WiMAX) and High Speed Packet Access Evolution (HSPA+). The resulting communication network which is formed by the user equipment 150 (or a plurality thereof) and the station 160 (or a plurality thereof) may be a cellular communication network, such as a cellular network conforming to one or more of LTE, LTE-A or HSPA+.

Figure 2:
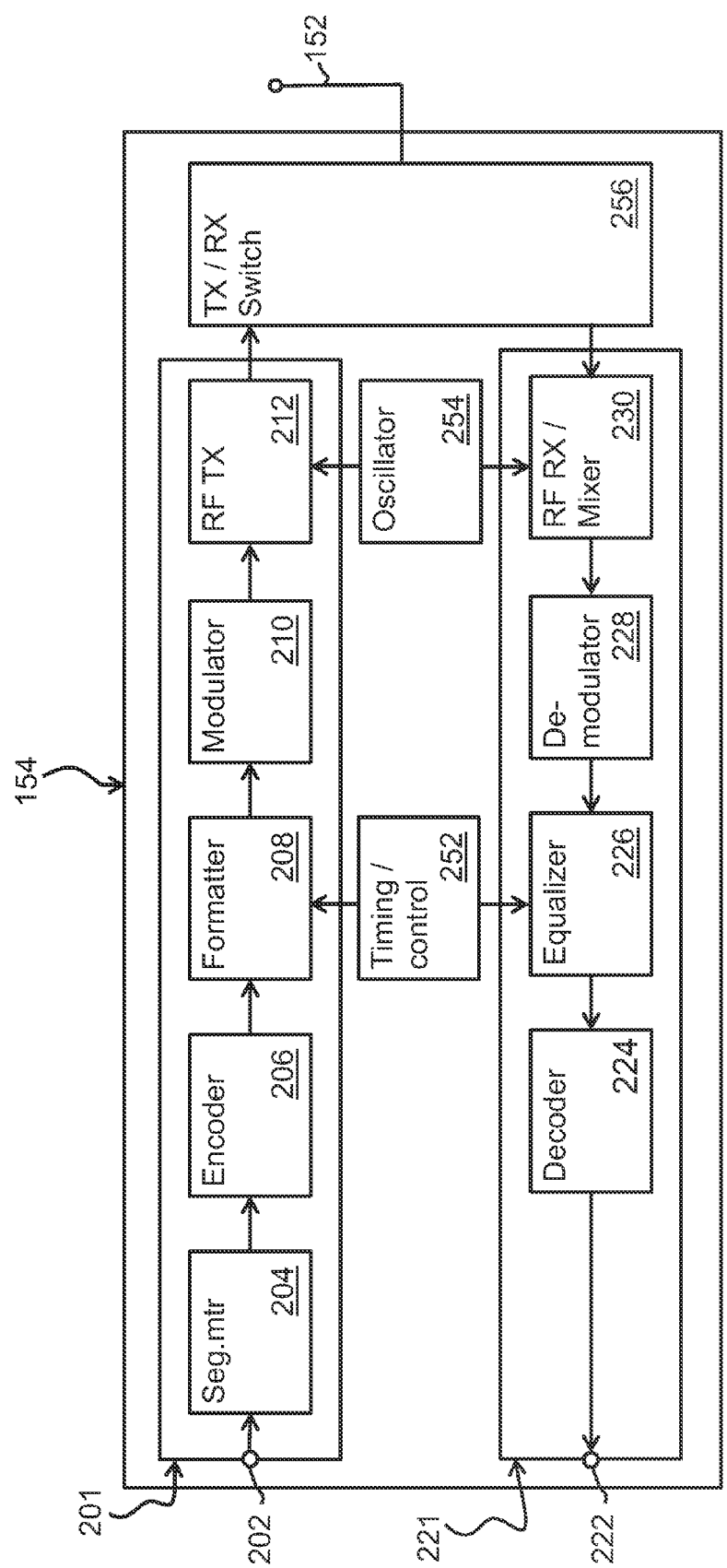
FIG. 2 is a schematic of signal processing circuitry which could be employed in the communication system of FIG. 1.

FIG. 2 is a generalised schematic of the signal processing circuitry 154 that might be employed comprising, at a transmitter 201: a transmitter input 202, a segmenter 204, an encoder 206, for example a turbo encoder, a formatter 208, a modulator 210; a radio-frequency (RF) transmitter 212. In addition, at a receiver 221, there is: a receiver output 222; a decoder 224, an equalizer 226, a (baseband) demodulator 228; and a mixer 230.

For both the transmitter 201 and receiver 221, there may also be hardware which is shared, such as: the antenna 152 for receiving the RF signals 122 from the communications network, timing and control circuitry 252, and an oscillator 254, along with transmitter-receiver switch 256.

The transmitter 201 feeds a data stream to segmenter 204 where fixed-length data blocks of block size, K, are formed. These fixed-length data blocks are then passed to the encoder 206 which encodes the fixed length data blocks and sends the encoded data blocks successively as an encoded data stream to the formatter 208. The formatter 208 generates, at a prescribed time and with a prescribed amplitude, signal bursts, each comprising a series of waveforms. These bursts are passed to modulator 210 where each burst is modulated to RF frequency by mixing it with a carrier having a known frequency. The transmitter 201 then transmits each modulated burst as the RF signal 122 when the transmitter-receiver switch 256 connects the antenna 152 to the transmitter 201. The oscillator 254, which is connected to the modulator 210 tracks timing and is used by the modulator 210 to generate the carrier waveform. The timing and control circuitry 252 controls the formatting and timing of the bursts as generated by the formatter 208.

For the receiver 221, when the antenna 152 receives the RF signal 122 containing a burst and the radio frequency (RF) receiver/mixer 230 is connected to the antenna 152 via the switch 256, the received burst is amplified in the radio frequency (RF) receiver/mixer 230, and then demodulated in the demodulator 228 so as to remove the RF carrier. The equalizer 226 filters each demodulated burst to produce an enhanced digital signal which is next decoded by decoder 224.

The decoder 224 decodes the digital signal and passes it via receiver output 222 to the processing circuitry 156 within the user equipment 150 for use and/or further processing. The decoder 224, may wholly or partially be implemented in hardware, or implemented in software executable on dedicated or shared processing circuitry, or implemented partially for certain elements in software, with other elements implemented hardware. The processing circuitry 156 may perform all or certain elements of the signal processing of the decoder 224 as described below. Alternatively, or in addition, the signal processing circuitry 154 may comprise dedicated processing circuitry and memory for performing all or certain elements of the signal processing as described below. In any event, the decoder 224 provides and/or comprises, via hardware, or software or a combination of the two, a ML signal detector/decoder.

Figure 3:
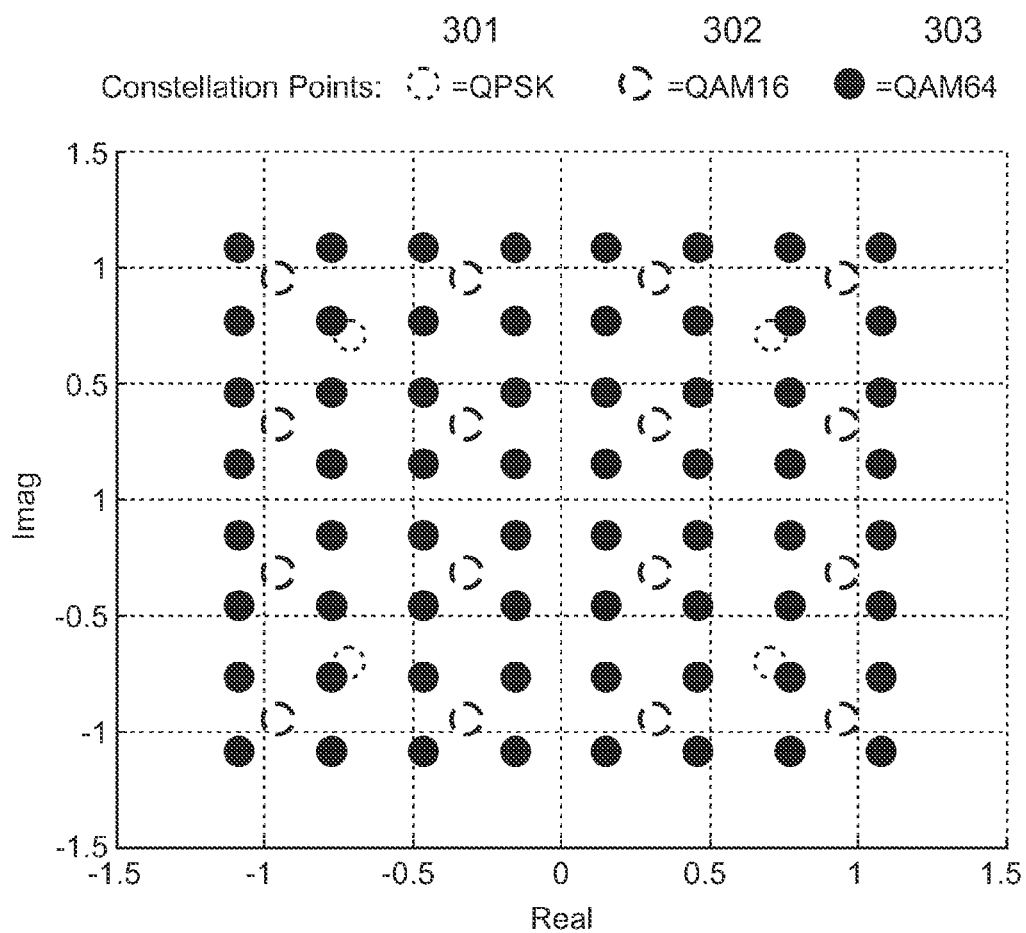
FIG. 3 is a chart of constellation points utilised by various modulation schemes.

FIG. 3 shows the constellation points for three different modulation orders which are, for example supported by LTE/LTE-A across multiple layers between multiple UEs. These orders are:

QPSK (4 constellation points 301);
QAM16 (16 constellation points 302); and
QAM64 (64 constellation points 303).

For conventional ML decoding, the decoder requires knowledge of the modulation order on the other layer. As proposed herein, there are two methods to avoid having to know this:

Method 1: Decoder Configured to Assume Modulation on the Other Layer is QAM64

In this case, if the other layer is employing QAM64 we get full ML performance. If not then we get a slight degradation due to the fact that the actual transmitted symbols do not quite fall on the QAM64 grid (see FIG. 3). This method requires no hardware modification to a conventional ML decoder, rather the ML decoder 224 is configured to make the assumption.

Method 2: Decoder is Configured to Try all Possible Constellation Points for the Other Layer In total, there are 85 (i.e. 1+4+16+64) (QAM85) possible different constellation points in a set of points available for the second layer (1 for the zero-point, 4 for QPSK, 16 for QAM16 and 64 for QAM64 constellation), which have to be taken into account by the decoder 224 comprising the ML detector. By this approach the search space for the unknown (second) layer is fully covered. The points utilised in the first layer may be a subset of the set of points available for the second layer. This method requires additional metrics for all constellation points to be known by the decoder 224 compared to a conventional decoder.

In essence, the example ML decoder 224 is configured such that it makes an assumption about the search space of the modulation scheme or order of other UEs operating on the same communication channel having multiple layers, and then performs a search across the entire search space to minimise the Symbol Error Rate (SER), and thereby output a digital signal which provides minimal SER for all assumed modulation schemes. This provides superior detection quality for single layer transmission in the context of MU-MIMO and simultaneous transmission on the other layer. The ML decoder 224 is utilised in a customized way on the basis that the modulation order of the other layer is not known.

Of course, the modulation order of the wanted/desired layer is known, meaning that, for this layer, there is no need to extend the search space for the constellation points.

As will be shown below, the above approaches provide improved SER performance compared to ZF and MMSE detection. However, full ML single layer SER performance with knowledge of the modulation order of the other layer (which acts as a reference) cannot be achieved, except for method 1 above when 64QAM is actually being transmitted on the other layer.

The method and decoder 224 disclosed herein can be applied in MU-MIMO scenarios of any state-of-the-art communication system (as mentioned above). For example, in case of LTE (Release 9) the invention is applicable for TM8, and in case of LTE-A (Release 10), the invention is additionally applicable for TM9.

Figure 4:
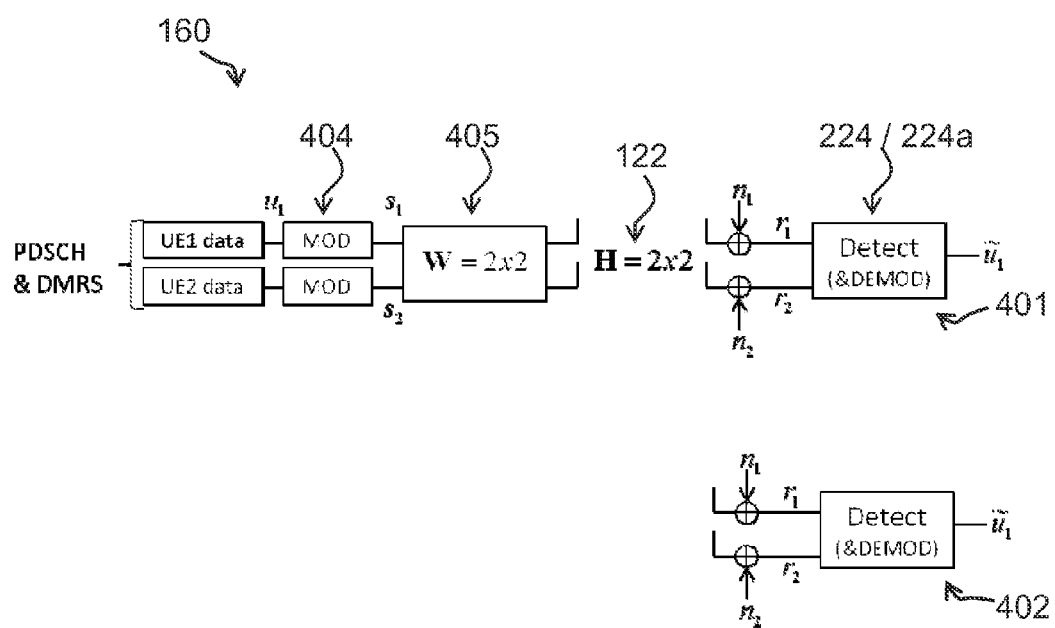
FIG. 4 is a schematic of the functional components of an exemplary MU-MIMO system.

By way of example, the performance of the exemplary ML detector 224 in comparison to other forms of MIMO detection, such as ZF detection, MMSE detection and ML detection (when the modulation scheme is of the other UE is known) is illustrated with reference to FIGS. 5 to 7 which are further discussed below. The performance of the various detection schemes of these figures is determined based on an exemplary MIMO system 400 which is illustrated in FIG. 4.

A base station (eNb) 403 generates two payload data streams, i.e. Physical Downlink Shared Channels (PDSCHs), for two layers: layer 1 (L1) contains data for a first UE (UE1) 401 and layer 2 (L2) contains data for a second UE (UE2) 402. Additionally each layer contains also dedicated pilots, so called demodulation reference signals (DMRS), which are required for signal detection for UE1 and UE2, respectively. The PDSCH/DMRS data for each layer is modulated in modulator 404 using either Quadrature Phase Shift Keying (QPSK) or Quadrature Amplitude Modulation (QAM), e.g.

QAM16 or QAM64 modulation. The complex modulation symbols of layer 1 and layer 2 are precoded together using a 2×2 precoding matrix W in precoder 405 and transmitted as RF signals 122 at the same time via two antenna elements over the same physical resource. The transmitted data experiences the channel H and is received from UE1 via two receive antennas, where additive white Gaussian noise (AWGN) noise can be assumed. The effective channel $H_{eff}=H \times W$ can be estimated based on DMRS, meaning that the precoding is transparent for the UE (the UE has no knowledge about the channel H and the applied precoding W). The noise can be estimated based on cell-specific reference signals (RS). Based on this information the detection and demodulation processing using ZF, MMSE or ML is applied, resulting in the estimated symbol sequence, which is then compared with the transmitted symbol sequence to calculate the symbol error rate (SER), which is a measure of the detection quality.

Concerning the expression $H_{eff}=H \times W$:

H is the channel matrix of size $N_{rx} \times N_{tx}$ ($N_{tx}$=number of transmitting (Tx) antennas, $N_{rx}$=number of receiving (Rx) antennas);

W is the precoding matrix used ($N_{tx} \times N_L$) ($N_L$=number of transmitted layers); and $H_{eff}$ is the effective channel matrix ($N_{rx} \times N_L$).

The signal processing for UE2 is identical to the description related to UE1 401 and omitted here. In essence, the layer 2 data for UE2 402 acts as interference for data of layer 1 for UE1 401 and vice versa.

Two receive antennas as well as estimation of the full 2×2 effective channel matrix Heff and 2-layer MIMO detection are required at the UEs, unless the effective channel $H_{eff}=H \times W$ is fully orthogonal which would imply full spatial separation between both layers), because otherwise strong interference from the other layer will corrupt the signal of the wanted layer.

The decoder 224 assumes that a set of constellation points (e.g. comprising points for multiple modulation schemes) is available for layer 2 and knows what constellation points (e.g. which single modulation scheme) has been utilised for layer 1. The decoder performs a search across all combinations of points which result from the combination of the known set for layer 1 and the assumed set for layer 2. In essence, for each constellation point on layer 1, the constellation point on layer 2 is found which minimizes the SER, e.g. the log-likelihood (LLR) metric $|U(y-Hx)|^2$. Thus, for example, for QPSK, QAM16 or QAM64 known to be utilised on layer 1, the decoder 224 performs minimisation of the SER for all other constellation points in the set of constellation points available for layer 2 (e.g. 1 point for the zero-point, 4 points for QPSK, 16 points for QAM16 and 64 points for QAM64).

Concerning the expression, $|U(y-Hx)|^2$:

H is the channel matrix of size $N_{rx} \times N_{tx}$ ($N_{tx}$=number of transmitting (Tx) antennas, $N_{rx}$=number of receiving (Rx) antennas);

Y is the received signal vector ($N_{rx} \times 1$);

X is the transmitted signal vector ($N_L \times 1$); and

U is the inverse square root of the noise covariance matrix ($N_{rx} \times N_{rx}$).

In this regard, X is unknown, and is or corresponds to the determined transmitted signal, H and U are constant for a particular channel configuration, and Y is or corresponds to the received signal. The above expression is minimised for all points in the set of modulation schemes which define modulation schemes available for the second transmission layer, and X is determined based on the values of X which minimise the above expression.

In order to achieve an orthogonal effective channel $H_{eff}=H*W$ the eNb 403 needs to know, which precoding to apply and this information is provided either from a channel state information (CSI) feedback from the UEs and/or by exploiting the channel reciprocity between eNb 403 and UE in case of TDD. Furthermore the channel conditions are assumed to be quasi-stationary. Note that the precoding codebook does not have infinite granularity, which means that a perfect orthogonalization of the effective channel Heff is usually not possible. In the best case, MU-MIMO using two layers for two different UEs can double the cell capacity as it can for single user MIMO.

Figure 5:
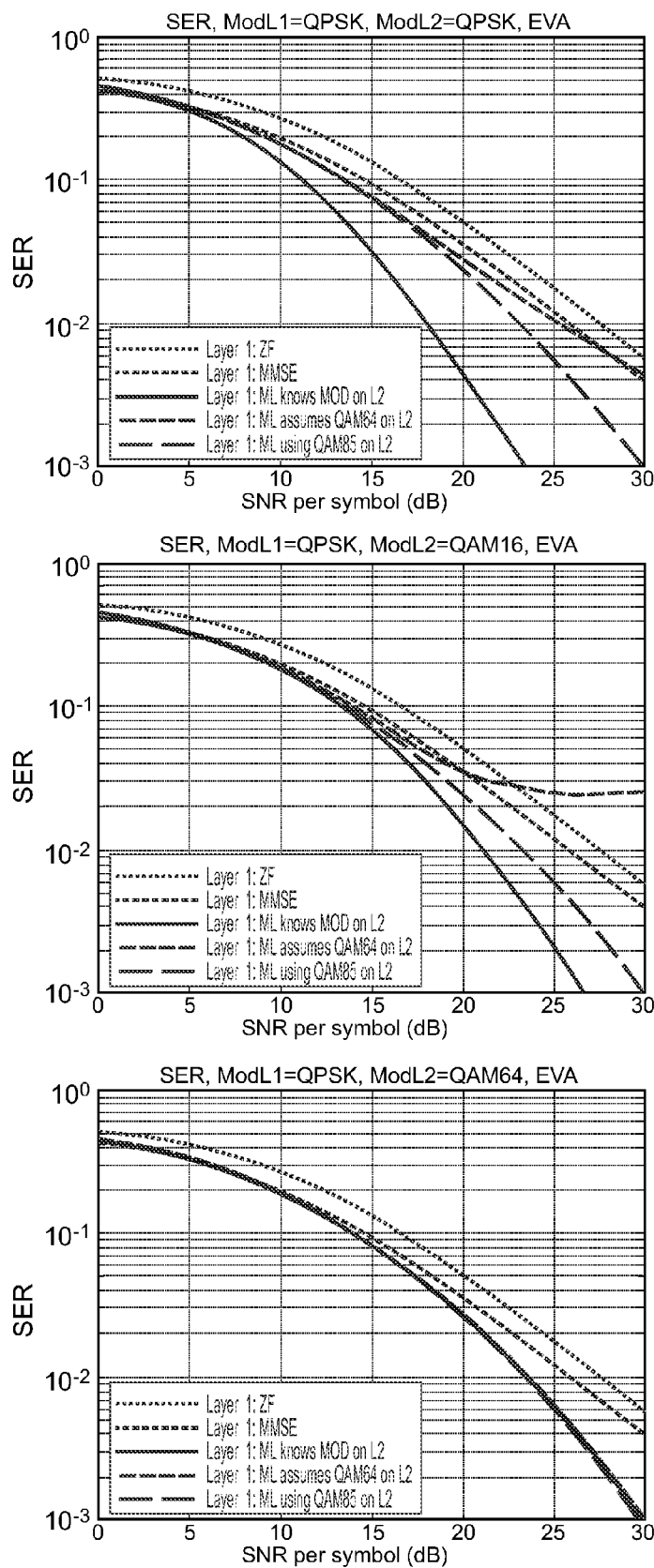
FIGS. 5 to 7 show SER against SNR per symbol for various decoder implementations.
Figure 6:
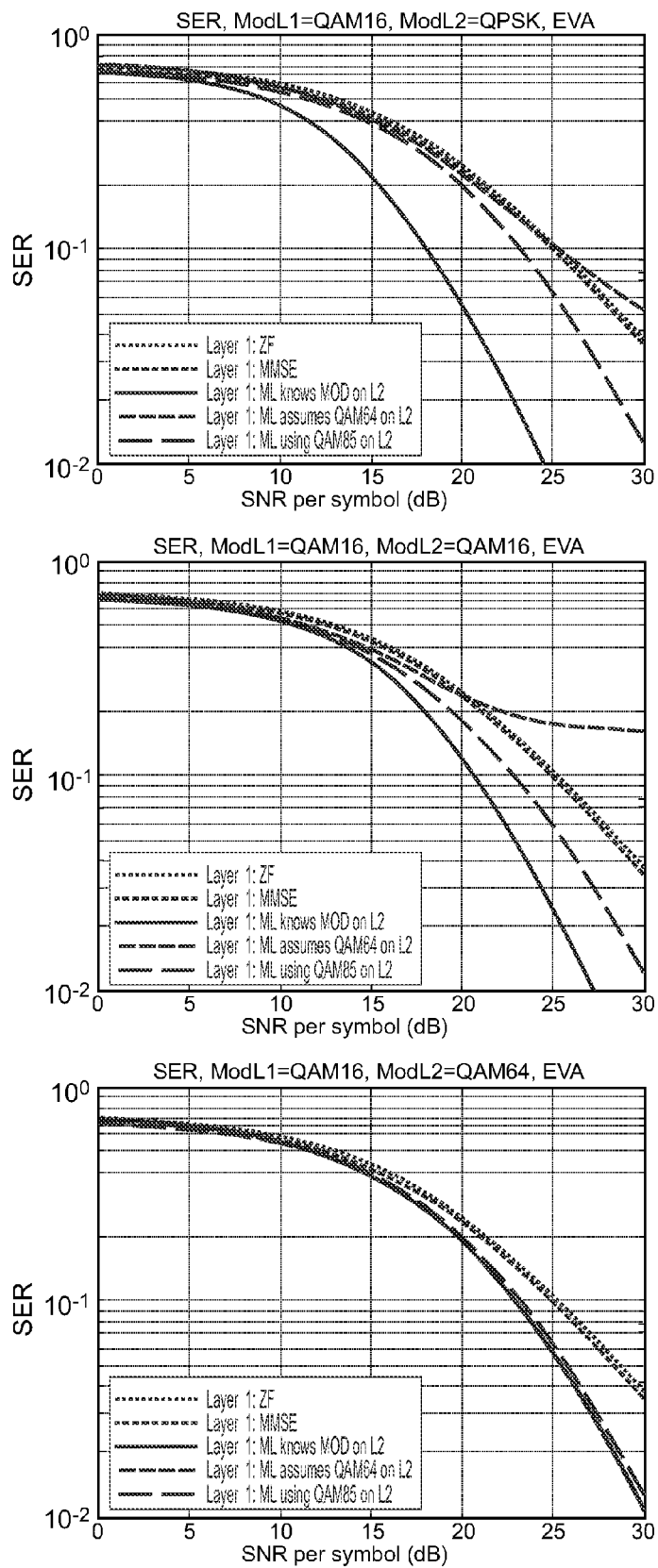
Figure 7:
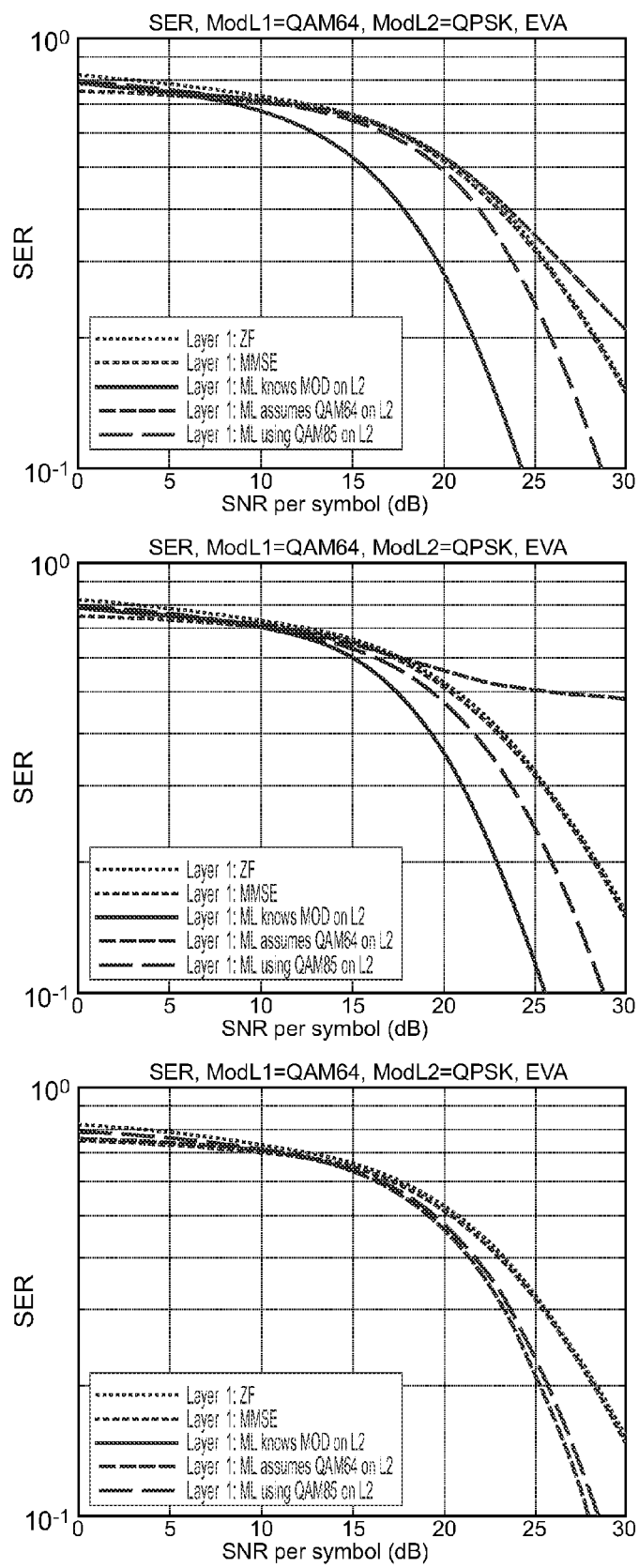

FIGS. 5 to 7 represent simulated results based on the system 400 of FIG. 4 employing, for exemplary purposes, TM8 and TM9 of LTE/LTE-A according to section B.4.1 of 3GPP TS 36.101: User Equipment (UE) radio transmission and reception (Release 10), V10.9.0. The following assumptions are made:

Two layer transmission, layer 1 is for the UE1 (wanted) and layer 2 is for UE2 (unwanted, acts as interfering signal)

Both layers are precoded using random 2×2 precoding matrices W according to section B.4.1 of [1]

Ideal channel estimation is assumed, meaning the effective channel matrices Heff=H*W are perfectly known for each subcarrier at the UE.

Three detector types are considered: ZF, MMSE and ML based solutions

No colored noise assumed, meaning the noise covariance matrix is just a diagonal matrix and no noise pre-whitening is required. However, the effects of colored spatial noise could be included for ML detection.

Low antenna correlation for Tx and Rx is assumed.

Only the SER (Symbol Error Rate) is evaluated, as this is sufficient to compare the detection performances of the three different detectors.

The simulation results are shown in FIGS. 5 to 7 for single layer detection with simultaneous transmission for the following five different detector 224/224a variants:

ML detector with knowledge of the modulation order of the other layer (reference);

Method 1: ML detector assuming QAM64 on the other layer;

Method 2: ML detector & Search Space Extension to QAM85 for the other layer;

MMSE detector; and

ZF detector.

Detector 224 according to the present disclosure is an ML detector in which a set of one or more modulation schemes with corresponding constellation points is assumed for the other layer (e.g. layer 2), and where at a given time, a single modulation scheme is known for the desired layer (e.g. layer 1). Detector 224a is either an ML detector with explicit knowledge of the single modulation scheme currently being utilised on the other layer, or is an MMSE, or ZF detector.

FIG. 5 shows charts of SER against SNR per Symbol (db) for layer 1 (L1) utilising QPSK and layer 2 (L2) utilising QPSK, QAM16 or QAM64, based on an Extended Vehicular A model (EVA) channel. The following can be noted in respect of FIG. 5:

The smaller the modulation order, the bigger the performance gap is between ZF and MMSE.

The ZF and MMSE performance is independent of the modulation order of the 2nd layer, as this parameter is not taken into account at all in the detection process.

Method 1: In the case of ML and QAM64 assumption for the 2nd layer, a residual error is caused if the modulation assumption of the 2nd layer is wrong. This residual error depends on the minimum distance between the constellation points of the QAM64 grid and the constellation points of the QPSK and QAM16 grid. QAM16 on the 2nd layer is the worst case.

Method 2: ML and QAM85 (combination of QAM64, QAM16, QPSK and zero-point) outperforms the ZF, MMSE and the ML with QAM64 assumption. Note that for ML and QAM85 the SER performance is independent of the modulation order of the 2nd layer, since all possible constellation points are always taken into account. The lack of knowledge about the used modulation order of the other (interfering) layer can be interpreted as a lack in a priori information, which leads to significant SER performance drop compared to the reference.

The higher the modulation order of the 2nd layer, the worse the interference is for the 1st layer and vice versa for the reference (ML & known modulation) in the case of fixed channel conditions.

FIG. 6 shows charts of SER against SNR per Symbol (db) for layer 1 (L1) utilising QAM64 and layer 2 (L2) utilising QPSK, QAM16 or QAM64, based on an Extended Vehicular A model (EVA) channel. The following can be noted in respect of FIG. 6:

For QAM16, the performance gap between ZF and MMSE is much smaller compared to QPSK.

The ZF and MMSE performance is independent of the modulation order of the 2nd layer, as this parameter is not taken into account at all in the detection process.

Method 1: In case of ML and QAM64 assumption for the 2nd layer, a residual error is caused if the modulation assumption of the 2nd layer is wrong. This residual error depends on the minimum distance between the constellation points of the QAM64 grid and the constellation points of the QPSK and QAM16 grid. QAM16 on the 2nd layer is the worst case.

Method 2: "ML and QAM85" (combination of QAM64, QAM16, QPSK and zero-point) outperforms the ZF, MMSE and the "ML with QAM64 assumption". Note that for ML and QAM85 the SER performance is independent of the modulation order of the 2nd layer, as always all possible constellation points are taken into account. The lack of knowledge about the used modulation order of the other (interfering) layer can be interpreted as a lack in a priori information, which leads to significant SER performance drop compared to the reference.

The higher the modulation order of the 2nd layer, the worse the interference is for the 1st layer and vice versa for the reference (ML & known modulation) in the case of fixed channel conditions.

FIG. 7 shows charts of SER against SNR per Symbol (db) for layer 1 (L1) utilising QAM64 and layer 2 (L2) utilising QPSK, QAM16 or QAM64, based on an Extended Vehicular A model (EVA) channel. The following can be noted in respect of FIG. 7:

For QAM64, the performance gap between ZF and MMSE is much smaller compared to QAM16.

The ZF and MMSE performance is independent of the modulation order of the 2nd layer, as this parameter is not taken into account at all in the detection process.

Method 1: In the case of ML and QAM64 assumption for the 2nd layer, a residual error is caused if the modulation assumption of the 2nd layer is wrong. This residual error depends on the minimum distance between the constellation points of the QAM64 grid and the constellation points of the QPSK and QAM16 grid. QAM16 on the 2nd layer is the worst case.

Method 2: "ML and QAM85" (combination of QAM64, QAM16, QPSK and zero-point) outperforms the ZF, MMSE and the "ML with QAM64 assumption". Note that for ML and QAM85 the SER performance is independent of the modulation order of the 2nd layer, as always all possible constellation points are taken into account. The lack of knowledge about the used modulation order of the other (interfering) layer can be interpreted as a lack in a priori information, which leads to significant SER performance drop compared to the reference.

The higher the modulation order of the 2nd layer, the worse the interference is for the 1st layer and vice versa for the reference (ML & known modulation) in case of fixed channel conditions.

The simulation results (FIGS. 5 to 7) for single layer detection with simultaneous transmission on the other layer lead to the following conclusions:

Firstly, utilising an ML detector with knowledge of the modulation order of the other layer (Reference) leads to the smallest amount of interference in the detection process between the two layers and provides optimum SER performance. As the modulation order of the other layer is in general not known by the UE, this solution has acted as reference for comparison.

The ML detector and QAM64 assumption achieves optimum ML performance if the modulation order of the other layer is QAM64. In case of QPSK or QAM16 modulation on other layer the SER performance is better than MMSE performance for SNR less than approx. 22 dB or SNR less than approx. 17 dB, respectively.

The ML detector and search space extension to QAM85 for the other layer achieves best SER performance of all compared detectors compared to the reference. The difference to the reference ML solution is caused by the lack of a priori information of the modulation order of the other layer.

The use of an MMSE detector or a ZF detector leads to inferior SER performance. For high SNR, the ZF and MMSE performances merge into each other, as the noise variance is negligible in this SNR area.

It will be appreciated that the invention has been described above by way of examples, and that modifications departing from the examples may be applicable within the scope of the invention, which is defined by the appendant claims.

The invention claimed is:

1. A method of symbol detection in an electronic device employing multi-user multiple input multiple output (MU-MIMO) communication over a first transmission layer of first and second transmission layers, comprising:
    receiving a transmitted signal; and
    decoding the transmitted signal by detecting data symbols within the transmitted signal for the first transmission layer by performing Maximum Likelihood (ML) detection on the first transmission layer,
    wherein the step of performing ML detection comprises performing a search across all possible symbol constellation points in a set of all constellation points available for the second transmission layer and wherein said set of symbol constellation points for the second transmission layer comprises a zero point and all points in QPSK, QAM16 and QAM64 modulation schemes.

2. The method of claim 1, wherein the step of performing the search comprises determining the most likely transmitted data symbols for the first transmission layer which result in the smallest symbol error for all data symbols across said all possible symbol constellation points.

3. The method of claim 2, further comprising outputting the most likely transmitted data symbols for the first transmission layer.

4. The method of claim 1, wherein the first transmission layer comprises data symbols modulated based on constellation points which are a subset of the set of constellation points available for the second transmission layer.

5. The method of claim 4, wherein said set of symbol constellation points for the second transmission layer comprises a zero point and all points in QPSK, QAM16 and QAM64 modulation schemes.

6. The method of claim 5, wherein said subset of symbol constellation points for the first transmission layer consist of all points in one of: QPSK, QAM16 and QAM64 modulation schemes.

7. The method of claim 1, wherein the step of performing the search further comprises performing the search across all possible symbol constellation points known for the first transmission layer and available for the second transmission layer.

8. The method of claim 1, wherein the first transmission layer is the transmission layer assigned to the electronic device.

9. The method of claim 8, wherein the second transmission layer is the transmission layer assigned to an additional device which is different to the electronic device.

10. An electronic device for performing multi-user multiple input multiple output (MU-MIMO) communication over a first transmission layer of first and second transmission layers, comprising:
a receiver for receiving a transmitted signal;
a decoder configured to decode the transmitted signal and detect data symbols within the transmitted signal for the first transmission layer by performing Maximum Likelihood (ML) detection on the first transmission layer with an ML detector,
wherein the ML detector is configured to perform a search across all possible symbol constellation points in a set of all constellation points available for the second transmission layer and wherein said set of symbol constellation points for the second transmission layer comprises a zero point and all points in QPSK, QAM16 and QAM64 modulation schemes.

11. The electronic device of claim 10, wherein the decoder comprises the ML detector.

12. The electronic device of claim 10, wherein the step of performing the search comprises determining the most likely transmitted data symbols for the first transmission layer which result in the smallest symbol error for all data symbols across said all possible symbol constellation points.

13. The electronic device of claim 12, further comprising outputting the most likely transmitted data symbols for the first transmission layer.

14. The electronic device of claim 10, wherein the first transmission layer comprises data symbols modulated based on constellation points which are a subset of the set of constellation points available for the second transmission layer.

15. The electronic device of claim 10, wherein said subset of symbol constellation points for the first transmission layer consist of all points in one of: QPSK, QAM16 and QAM64 modulation schemes.

16. The electronic device of claim 10, wherein the step of performing the search further comprises performing the search across all possible symbol constellation points known for the first transmission layer and available for the second transmission layer.

17. The electronic device of claim 10, wherein the first transmission layer is the transmission layer assigned to the electronic device.

18. The electronic device of claim 17, wherein the second transmission layer is the transmission layer assigned to an additional device which is different to the electronic device.

19. A non-transitory computer-readable medium comprising computer executable instructions which when executed by processing circuitry cause the processing circuitry to:
receive a transmitted signal; and
decode the transmitted signal by detecting data symbols within the transmitted signal for the first transmission layer by performing Maximum Likelihood (ML) detection on the first transmission layer,
wherein the performing ML detection comprises performing a search across all possible symbol constellation points in a set of all constellation points available for the second transmission layer and wherein said set of symbol constellation points for the second transmission layer comprises a zero point and all points in QPSK, QAM16 and QAM64 modulation schemes.

20. The non-transitory computer-readable medium of claim 19, wherein performing the search comprises determining the most likely transmitted data symbols for the first transmission layer which result in the smallest symbol error for all data symbols across said all possible symbol constellation points.

21. The non-transitory computer-readable medium of claim 20, where the processing circuitry is further caused to output the most likely transmitted data symbols for the first transmission layer.

22. The non-transitory computer-readable medium of claim 19, wherein the first transmission layer comprises data symbols modulated based on constellation points which are a subset of the set of constellation points available for the second transmission layer.

23. The non-transitory computer-readable medium of claim 22, wherein said set of symbol constellation points for the second transmission layer comprises a zero point and all points in QPSK, QAM16 and QAM64 modulation schemes.

24. The non-transitory computer-readable medium of claim 23, wherein said subset of symbol constellation points for the first transmission layer consist of all points in one of: QPSK, QAM16 and QAM64 modulation schemes.

25. The non-transitory computer-readable medium of claim 19, wherein performing the search further comprises performing the search across all possible symbol constellation points known for the first transmission layer and available for the second transmission layer.

26. The non-transitory computer-readable medium of claim 19, wherein the first transmission layer is the transmission layer assigned to the electronic device.

27. The non-transitory computer-readable medium of claim 8, wherein the second transmission layer is the transmission layer assigned to an additional device which is different to the electronic device.

* * * * *